Sept. 10, 1940. A. ROSENTHAL 2,214,478
LABEL CUTTING AND PACKING MACHINE
Filed Dec. 22, 1937 7 Sheets-Sheet 1

INVENTOR.
Arthur Rosenthal
BY Earl + Chappell
ATTORNEYS.

Sept. 10, 1940.　　　A. ROSENTHAL　　　2,214,478

LABEL CUTTING AND PACKING MACHINE

Filed Dec. 22, 1937　　　7 Sheets-Sheet 3

INVENTOR.
Arthur Rosenthal
BY Earl + Chappell
ATTORNEYS.

Sept. 10, 1940.　　A. ROSENTHAL　　2,214,478
LABEL CUTTING AND PACKING MACHINE
Filed Dec. 22, 1937　　7 Sheets-Sheet 4

INVENTOR.
Arthur Rosenthal
BY Earl & Chappell
ATTORNEYS.

Sept. 10, 1940.  A. ROSENTHAL  2,214,478
LABEL CUTTING AND PACKING MACHINE
Filed Dec. 22, 1937  7 Sheets-Sheet 5

INVENTOR.
Arthur Rosenthal
BY Earl & Chappell
ATTORNEYS

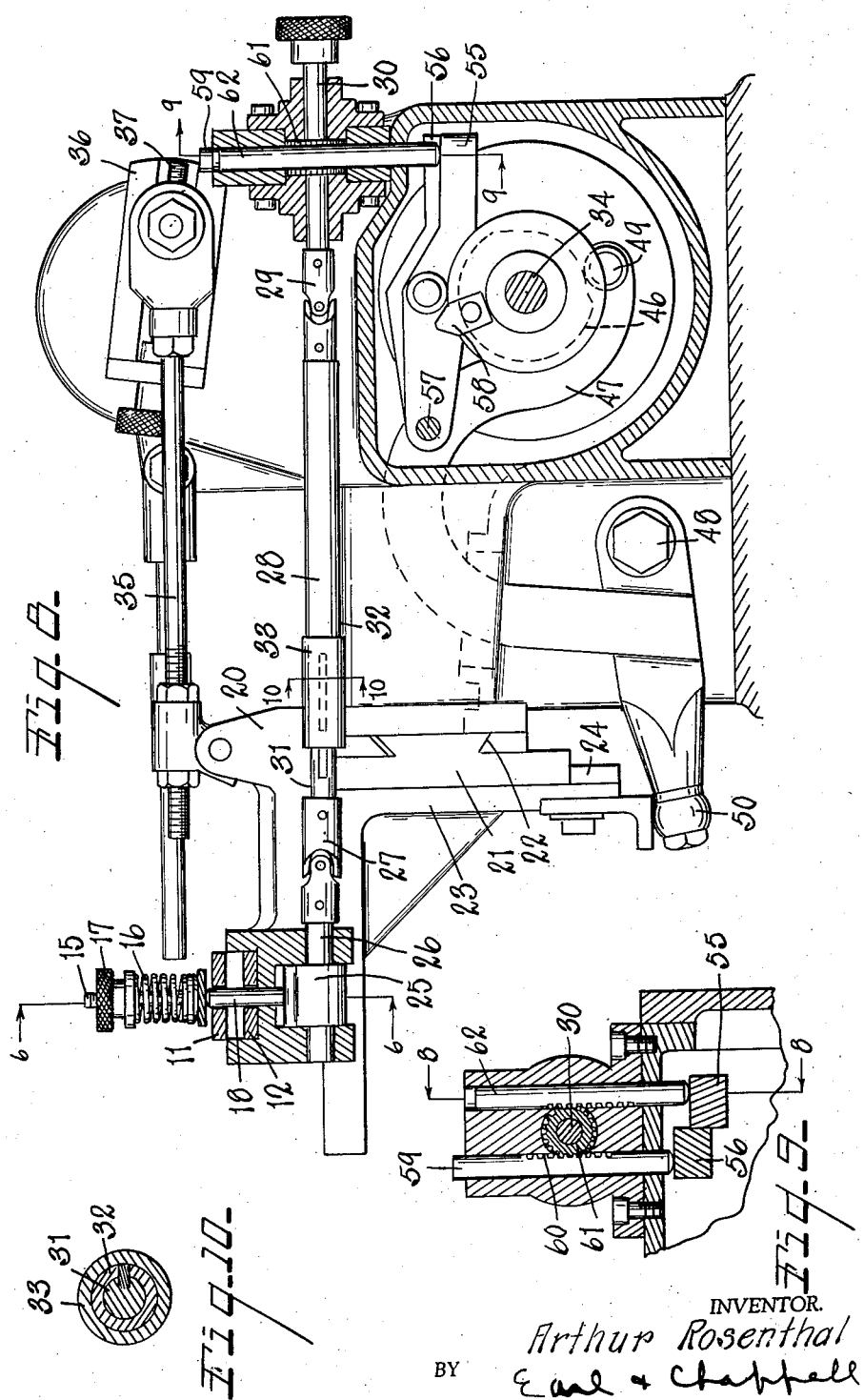

Sept. 10, 1940.　　　A. ROSENTHAL　　　2,214,478
LABEL CUTTING AND PACKING MACHINE
Filed Dec. 22, 1937　　　7 Sheets-Sheet 7
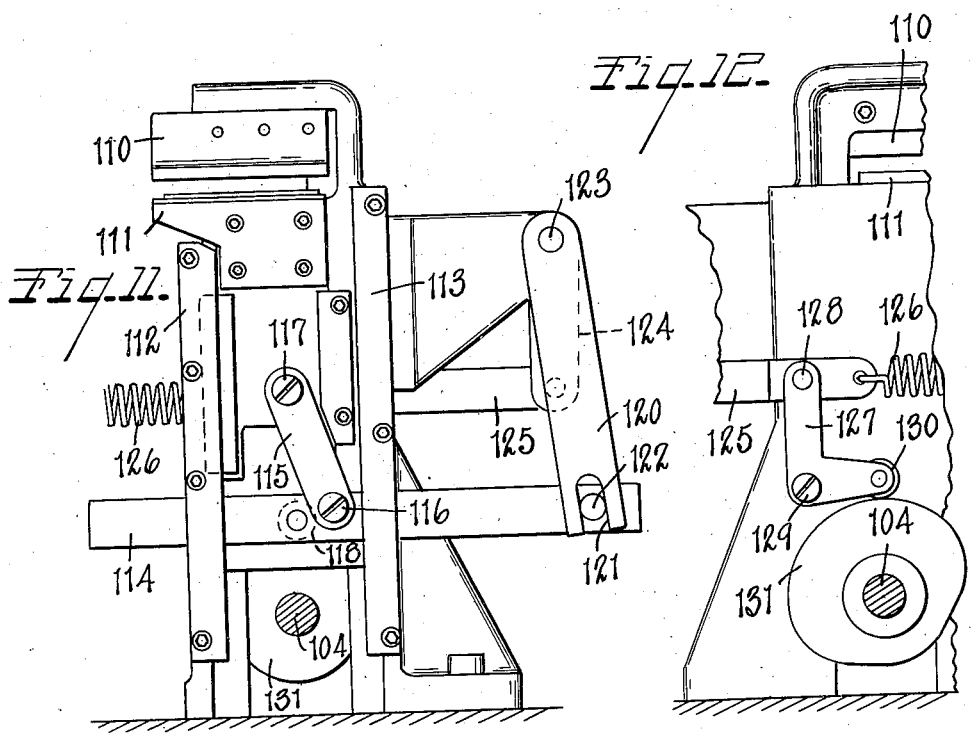
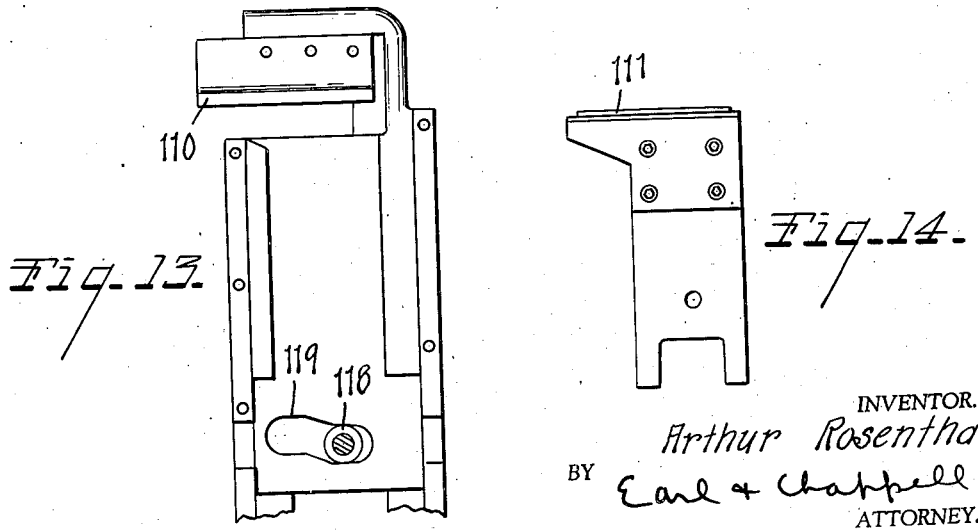
INVENTOR.
Arthur Rosenthal
BY Earl & Chappell
ATTORNEYS.

Patented Sept. 10, 1940

2,214,478

UNITED STATES PATENT OFFICE 2,214,478

LABEL CUTTING AND PACKING MACHINE

Arthur Rosenthal, Grand Rapids, Mich., assignor to Rose Patch & Label Company, Grand Rapids, Mich.

Application December 22, 1937, Serial No. 181,187

5 Claims. (Cl. 164—48)

This invention relates to improvements in label cutting and packing machines.

This invention relates to machines for cutting and packing labels or the like and relates in particular to machines for cutting and packing the labels which are employed on bottles for sealing the bottles and for displaying the trademark or other insignia of the vendor of the bottled goods. These labels consist of bands of a cellulose product similar to the regenerated cellulose product known as "Cellophane." These bands when wet fit loosely about the neck of the bottle at the cork or cap line and when dry shrink to closely embrace the neck of the bottle. The bands are made up as a continuous tube and the trade-mark or other legend is printed thereon. The individual bands are produced by severing a length of the tube which forms the band. It is desirable just as in any other labels such as fabric labels to be sure that the trade-mark or insignia on the label is properly centered or balanced so that the trade-mark is fully displayed on the label and is symmetrically arranged thereon.

The product, as has been stated, is made up in a continuous long tube which is made up into rolls of the flattened tubes. These rolls must be handled in a wet condition and must be cut and packed speedily and returned to the liquid in which they are kept prior to application to the bottle neck. In manufacture the closed tubes have some air in them and in the course of manufacture, if this air is not removed, it collects as the tube is rolled up completely extending the tube. To eliminate this difficulty, in manufacture a mutilation of some sort is made in the tube to relieve the air pressure produced by rolling up the tube. These mutilated portions of the labels are not desirable and must be eliminated when the tube is cut up to form the bands.

The objects of this invention are:

First, to produce a new and improved machine of the character described.

Second, to produce such a machine which is positive and accurate in operation and which operates at high speed with a minimum of clash and noise.

Third, to produce such a machine which is simple in its operation.

Fourth, to produce such a machine which is adjustable to accommodate different sizes of labels.

Fifth, to produce such a machine having a new and improved packing means thereon which is most satisfactory for handling the particular labels described although highly suitable for all types of labels.

Sixth, to produce such a machine in which the mutilated sections of the specific labels are located and eliminated during the cutting and packing operation.

Other objects and advantages pertaining to details and economies of construction and operation will appear from the description to follow. The invention is pointed out in the claims. A preferred embodiment of my improved machine is illustrated in the accompanying drawings, in which:

Fig. 8 is a detail view in section through the feed jaw operating mechanism, taken on line 8—8 of Figs. 5 and 9.

Fig. 9 is a fragmentary sectional view taken on line 9—9 of Fig. 8.

Fig. 10 is a detail sectional view taken on line 10—10 of Fig. 8.

Fig. 11 is a perspective view of the knife and the operating mechanism therefor.

Fig. 12 is a fragmentary view taken from the rear of Fig. 11.

Fig. 13 is a view of the upper blade of the knife and Fig. 14 is a view of the lower blade thereof.

Figure 4:
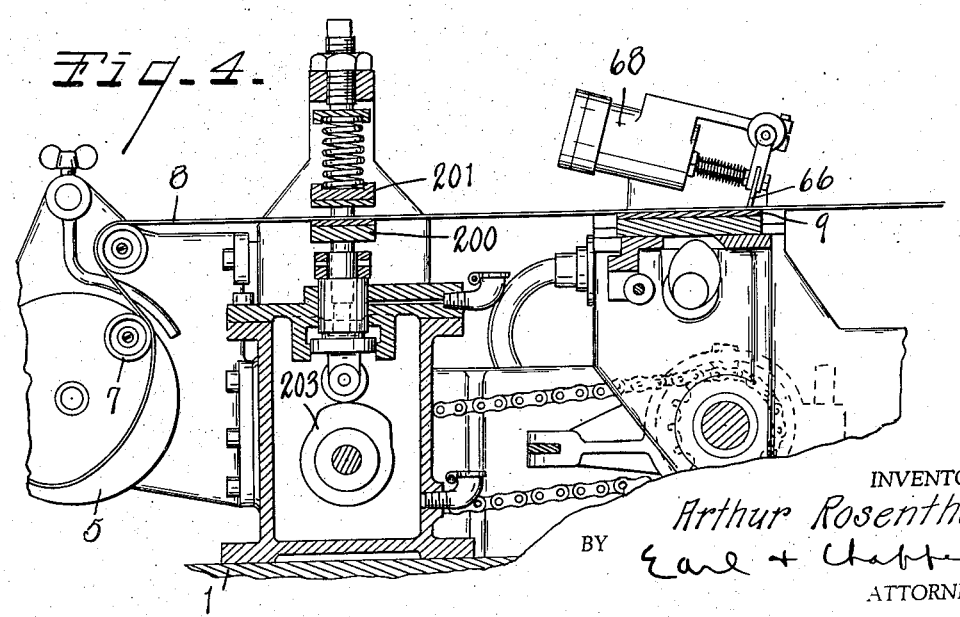
Fig. 4 is a detail sectional view through a portion of the balancing mechanism shown at the left hand side of Fig. 2.

A suitable base 1 is provided for mounting my machine. An arm 2 is provided supporting an axle 3 on which a roll 4 of the labels to be cut and packed is provided. The labels are fed from the roll by means of a suitable rotating disk 5 carrying an eccentric pin 7 which engages the label strip 8 as it comes from the roll, pulling off sufficient of the label strip to provide a loop so that the feeding and balancing mechanism does not have to supply the power for pulling the strip 8 from the roll 4. Cooperating with this mechanism is a clamping mechanism shown in Fig. 4 consisting of a fixed plate 200 and a cam operated clamping plate 201 which is controlled by a cam 203 which is so timed that the label strip is firmly held and clamped during non-feeding periods of the operation of the mechanism and while the pin 7 is engaging and operating on the strip 8. This feature forms no particular part of my invention and is not described in detail.

The label strip 8 passes over suitable beds 9 and 10 which are provided with longitudinal grooves. In handling the label strip of cellulose product which is employed for the manufacture of bottle sealing labels or capsules, these bed plates must be grooved to prevent sticking of the wet strip as it passes through the machine. The label strip is fed through the machine by means of feed jaws 11 and 12. I prefer to use feed jaws such as are shown in my Patent No. 2,144,084, issued January 17, 1939, for Label cutting and folding machine, which consist of a fixed lower jaw 12 to which is pivoted the upper jaw 11 by means of a pivot 13. The rear end or non-gripping end of the jaw 11 extends beyond the main pivot point and a lever member 14 overlies the jaw 11. A fixed rod 15 extends from the fixed jaw between the main pivot and the label gripping end of the jaw. This fixed rod 15 extends through the pivoted jaw 11 to the lever member 14. A compression spring 16 bears on the head 17 of the rod 15 and on the lever member 14, having a fulcrum bearing on the outer face of said lever member. A plunger 18 passes through the fixed jaw 12 and the pivoted jaw 11 between the fixed rod 15 and the label gripping ends of said jaws and engages the end of the lever member 14. The lever member 14 is fulcrumed at the end of the jaw 11 opposite the label gripping and at a point beyond the pivot 13 as at 19, so that an upward movement of the plunger 18 raises the end of the lever member 14 and fulcrums it on the spring 16 so as to exert a force on the end of the jaw 11 to cause it to open. When the plunger 18 is moved downwardly, the spring 16 engages the lever member 14 which in turn lies flat on the jaw 11 and closes it.

To effect a feeding of the label strip, I move the jaws 11 and 12 with a mechanism such as is shown in my Patent No. 2,144,084. This mechanism consists of a feeding slide 20 mounted in suitable ways on which is mounted an advancing and retracting slide 21 provided with suitable ways 22 on which is mounted an elevating slide 23 mounted in suitable ways 24.

The feeding jaws 11 and 12 are operated as indicated by a plunger 18 and a cam 25 is engaged therewith. The cam 25 is mounted on a shaft 26 provided with a universal joint 27 connected to a shaft 28 having a universal joint 29 connected with a shaft 30. The shaft 28 is extensible, being formed of the sections 31 and 32 which are splined in a spline collar 33, so that the rotation of the cam may be accomplished regardless of the position of the jaws 11 and 12.

The mechanism for moving the feed jaws through the slides 20, 21 and 23 consists of a drive shaft 34. This drive shaft is operatively connected to a link 35 to reciprocate the feeding slide to carry the jaws past the knife. The link 35 is connected to a crank 36 having an adjusting screw 37 and mounted on a shaft 38. A Geneva movement 39 connects the shaft 34 with the shaft 38. The Geneva movement is conventional and comprises a plate 40 with the pins 41 and the central member 42. The pins operate in slots 43 formed in a gear 44 which meshes with a gear 45 on the shaft 38. By means of this Geneva movement and the connecting link, the feed slide 20 is reciprocated most accurately to properly position the feeding jaws and carry them through the reciprocating feeding movement.

The elevating slide 23 is operated by a cam 46 on the shaft 34. A lever 47 pivoted at 48 and having a cam follower 49 engaging the cam 46 is provided. This lever carries a friction roller 50 which engages the bottom of the slide 23 so that the slide is raised and lowered as the shaft 34 rotates.

Figure 6:
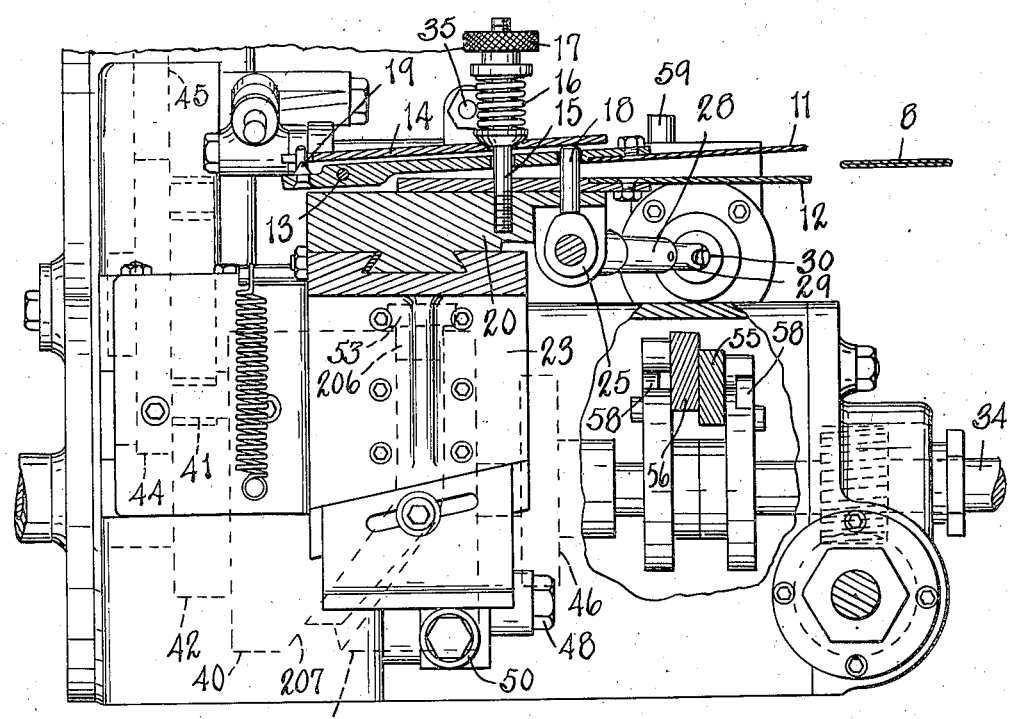
Fig. 6 is a detail sectional view through the label feeding jaws taken on the line 6—6 of Fig. 8.
Figure 7:
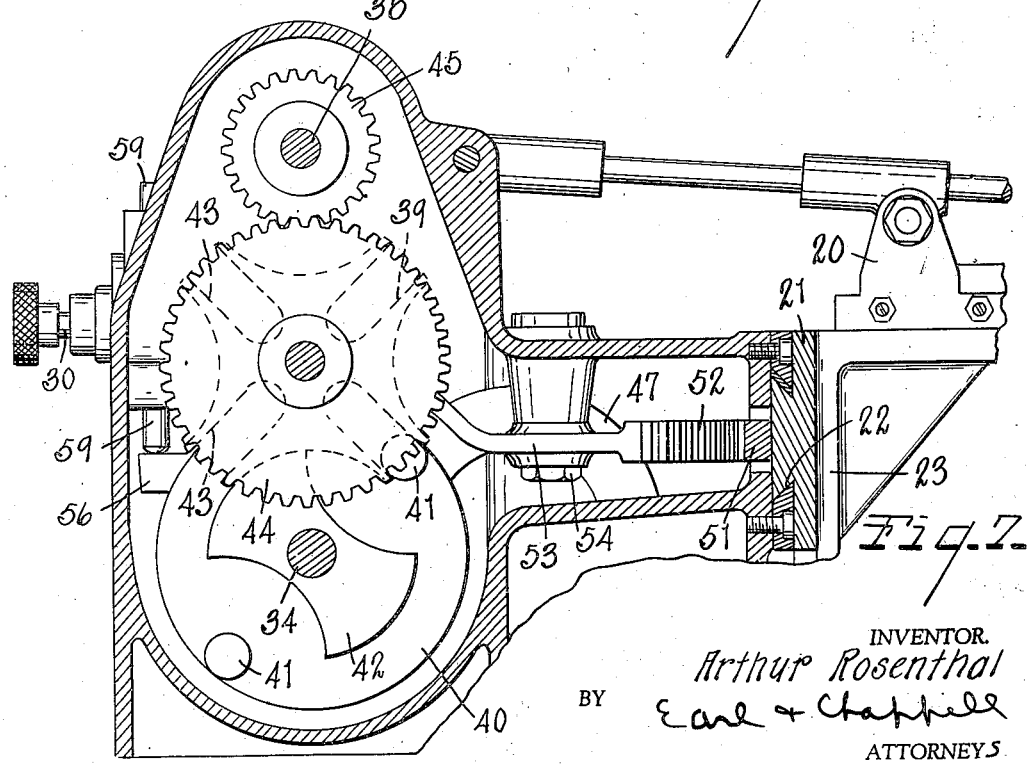
Fig. 7 is a detail sectional view through the operating mechanism for the mechanism for operating the feeding jaws.

The advancing and retracting slide 21 is actuated also as is the advancing and retracting slide in my said Patent No. 2,144,084. A rack 51 is provided on the slide meshing with the teeth 52 on the lever 53 pivoted at 54. A barrel cam 204, shown in dotted lines in Fig. 6, engages the end of the lever 53 shown in dotted lines in Fig. 6 and causes the advancing and retracting slide to move in and out to move the jaws 11 and 12 to label gripping position and to a position to retract them. This is accomplished through a cam follower 206 riding in cam slots 207 on the barrel cam 204.

The jaws 11 and 12 are made to open and close by means of levers 55 and 56. These levers are pivoted at 57 and are engaged by cams such as the cam 58 on the shaft 34. To open the jaws, one of the levers is raised by the cam and it in turn moves a pin 59 having rack teeth 60 engaging a pinion 61 on the shaft 30. A similar pin 62 which is engaged by the lever 55 causes the shaft to rotate in the opposite direction. This causes the cam 25 to turn from the position shown in Fig. 6 which opens the jaws to a right angle position which permits the spring 16 to close the jaws.

The timing of the operation is as follows: The jaws are open and the advancing and retracting slide moves the jaws in to grasp the end of the label strip 8. The shaft 30 is then rotated which causes the jaws 11 and 12 to close and grasp the end of the label strip. The feeding slide is then actuated causing the jaws to advance the label strip slightly more than a single label length. The machine may be adjusted by adjusting the crank 36 to give the desired feed. When the jaws have advanced, the knife, as will be later described, closes and severs an individual label from the end of the strip. The jaws are then slightly raised through a raising of the elevating slide 23 for a purpose to be later described and are then opened. The advancing and retracting slide is then actuated to retract the jaws and they are returned to initial position to grasp the label strip for further feeding.

Prior to the feeding of the label strip, it is balanced. I prefer to use a device such as is illustrated in my Patent No. 1,984,657, issued Dec. 18, 1934, for Label cutting and folding machine, to accomplish this balancing.

A photo-electric cell device 63 is provided in close proximity to the label strip 8. An electric light 64 shining through a suitable hood 65 is employed to direct a beam of light at the label strip at a point which is exposed to the photo-electric cell 63. After the label strip has been severed, it is grasped between the bed 10 which forms a jaw and a jaw 66 which are moved slowly backward by mechanism which forms no part of this invention and is not described in detail. As one of the trade-marks or insignia which are indicated at 67 on the label strip 8 passes into the field exposed to the photo-electric cell 63, the photo-electric cell energizes a circuit which operates a solenoid 68 which causes the jaw 66 to operate from the bed 10 leaving the label strip positioned accurately for the next feeding operation.

After the label strip has been severed, it is carried to a suitable packing mechanism. This mechanism comprises an open bottom packing tube 69 which has a wall 70 located directly above the label severing knife shown generally at 71. A fixed wall 72 is provided for the packing tube and the walls 73 and 74 are adjustable so that the packing tube may accommodate labels of different sizes.

The wall 70 and the walls 73 and 74 may be adjusted. A supporting frame 75 is provided and the wall 70 is held in position by a nut and bolt 76. The wall 73 which consists of two upright sections 77 and 78 each mounted adjustably on brackets 79 and 80 provided with nuts and bolts 81 and 82 extending through slot 83 in the frame 75 are provided. The wall 74 is provided with a bracket 84 and nut and bolts 85 extending from the frame 75 through the slot 86 in the bracket.

Figure 5:
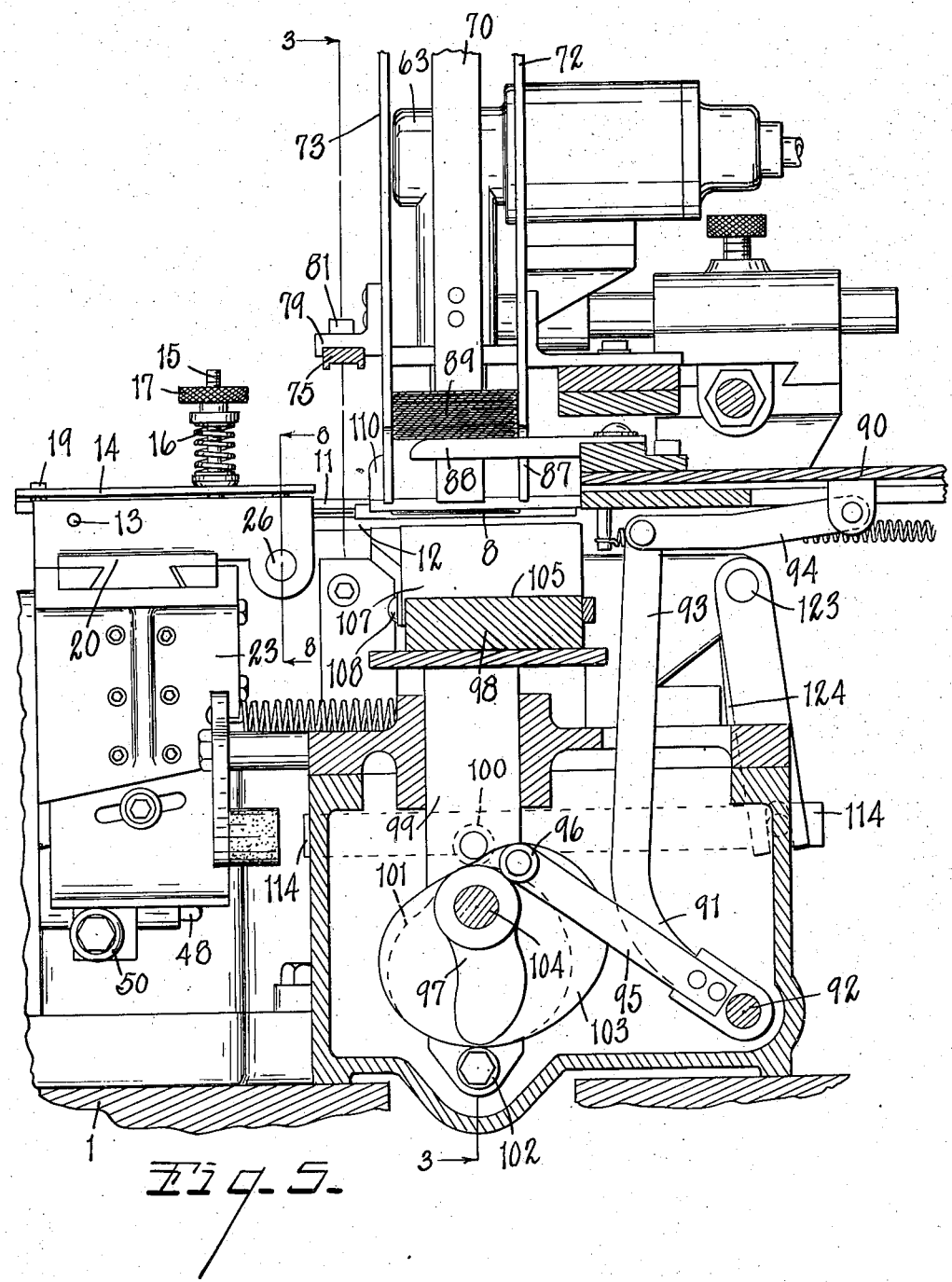
Fig. 5 is a detail sectional view through the packing mechanism and the operating parts thereof taken on the line 5—5 of Fig. 3.

The lower edge of the wall 72 is provided with a plurality of vertical slots 87 through which supporting fingers 88 extend. These supporting fingers extend across the open bottom of the packing tube 69 and normally support the severed labels in the packing tube which are shown at 89. These fingers are mounted on a suitable carriage 90 which is movable to retract the fingers from the position shown in Fig. 5 by moving them to the right as viewed in that figure.

The movement of the carriage 90 is accomplished through a bell crank lever 91 pivoted at 92 having its arm 93 connected by a link 94 to the carriage 90 and having its arm 95 provided with a cam follower 96 engaging a cam 97. A plunger 98 is provided for raising the severed labels up into the packing tube 69. This plunger is provided with a vertical supporting stem 99 having a cam follower 100 engaging a cam 101 and a cam follower 102 engaging a cam 103. These cams and the cam 97 are all mounted on a common shaft 104.

The plunger 98 consists of a head 105 having a plurality of kerfs or slots 106 therein. A plurality of individual fins 107 extending vertically and parallel with the label supporting fingers 88 but out of register therewith are inserted in the slots or kerfs 106. Screws 108 hold these fins removably in place and they may be removed individually to prevent any interference or clashing with the walls of the tube 69.

In operation, when the individual label has been severed from the end of the strip 8, the jaws 11 and 12 move upwardly, as has been described. As they move upwardly they move into a slot 109 formed between the two sections 77 and 78 of the side 73 of the packing tube and when the jaws are retracted by the operation of the advancing and retracting slide 21, 51, the jaws are stripped from the label and the plunger 98 engages the label immediately, carrying it upward. As the plunger 98 approaches the label supporting fingers 88, these fingers are quickly retracted and the plunger forces the label up into the packing tube 69. The fingers 88 are immediately returned beneath the label supported on the plunger 98 and pass between the fins 107 on the plunger 98 engaging the labels and holding them in the packing tube 69. The plunger 98 is moved downwardly to label receiving position ready to receive another label which is supplied by the feeding jaws, as has been described.

The knife is timed to operate after the feeding jaws have pulled the end of the balanced label strip through past the knife. The knife consists of two blades 110 and 111 mounted in suitable slides 112 and 113. Both of the jaws are movable. An operating bar 114 closes the jaws when it moves to the left as viewed in Fig. 11. A link 115 pivoted to the bar 114 by a screw 116 and to the blade 111 at 117 causes the blade 111 to move upwardly. At the same time the blade 110 moves downwardly because of the roller 118 moving in the slot 119. The roller 118 is mounted on the bar 114 as indicated in dotted lines in Fig. 11. The bar 114 is made to move through lever 120 slotted at 121 and engaging a pin 122 on the bar 114. The lever 120 is mounted on shaft 123 and a lever 124 is mounted on that shaft and connected to a link 125 which is provided with a spring 126 to hold the part in position. A bell crank lever 127 is pivoted to the link 125 at 128 and is pivoted at 129. A cam follower 130 is carried on one arm of the bell crank lever and is actuated by cam 131.

The mechanism for locating the air holes punched in the label strip during manufacture is indicated generally at 132. It consists of a photo-electric cell 133 and a light 134 mounted on the other side of the label strip so that when the mutilation in the label strip passes between the light and the photo-elecrtic cell, the photo-electric cell is energized to stop the operation of the machine by throwing out the clutch of the machine through electrical controls preferably including a solenoid.

Figure 1:
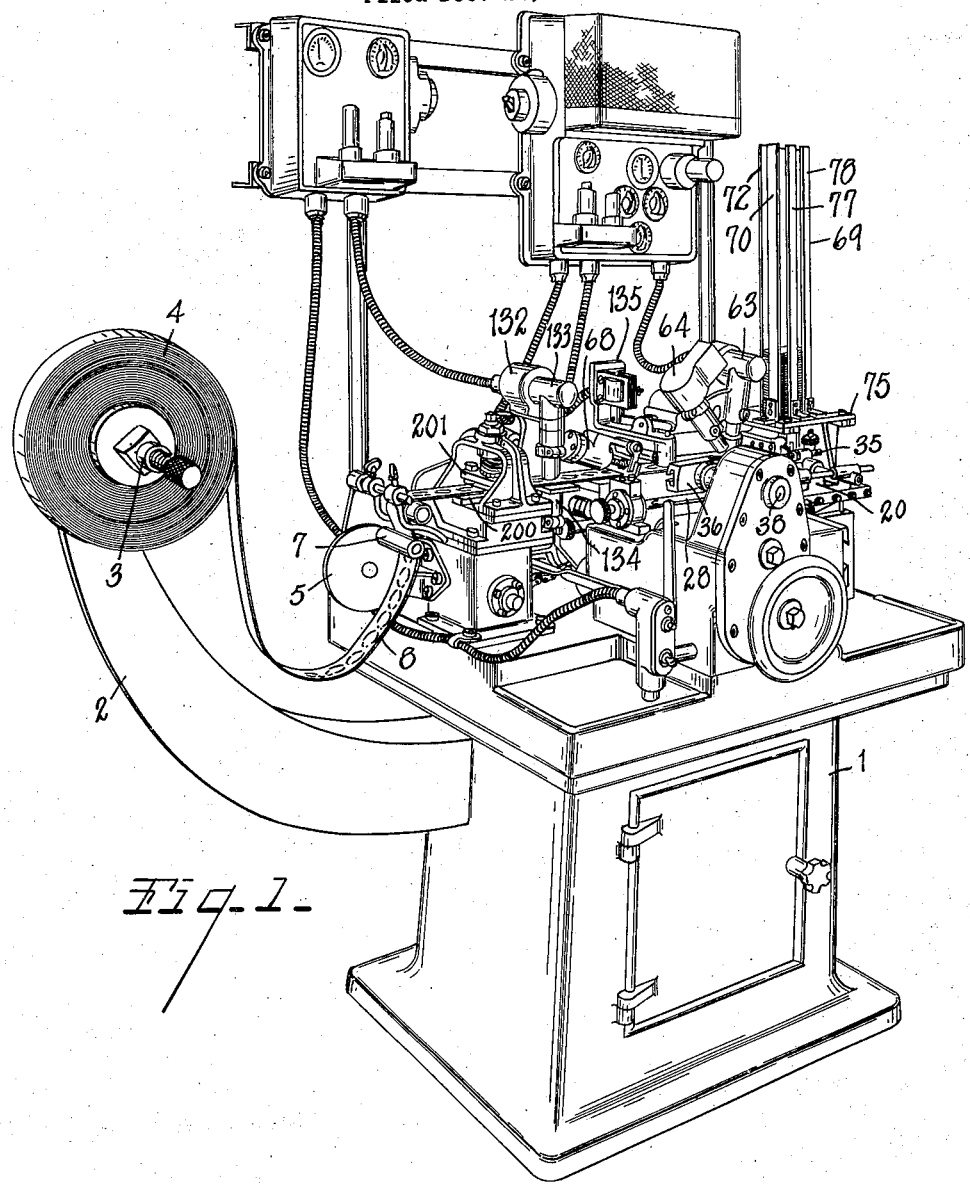
Fig. 1 is a perspective view of a machine embodying my invention.
Figure 2:
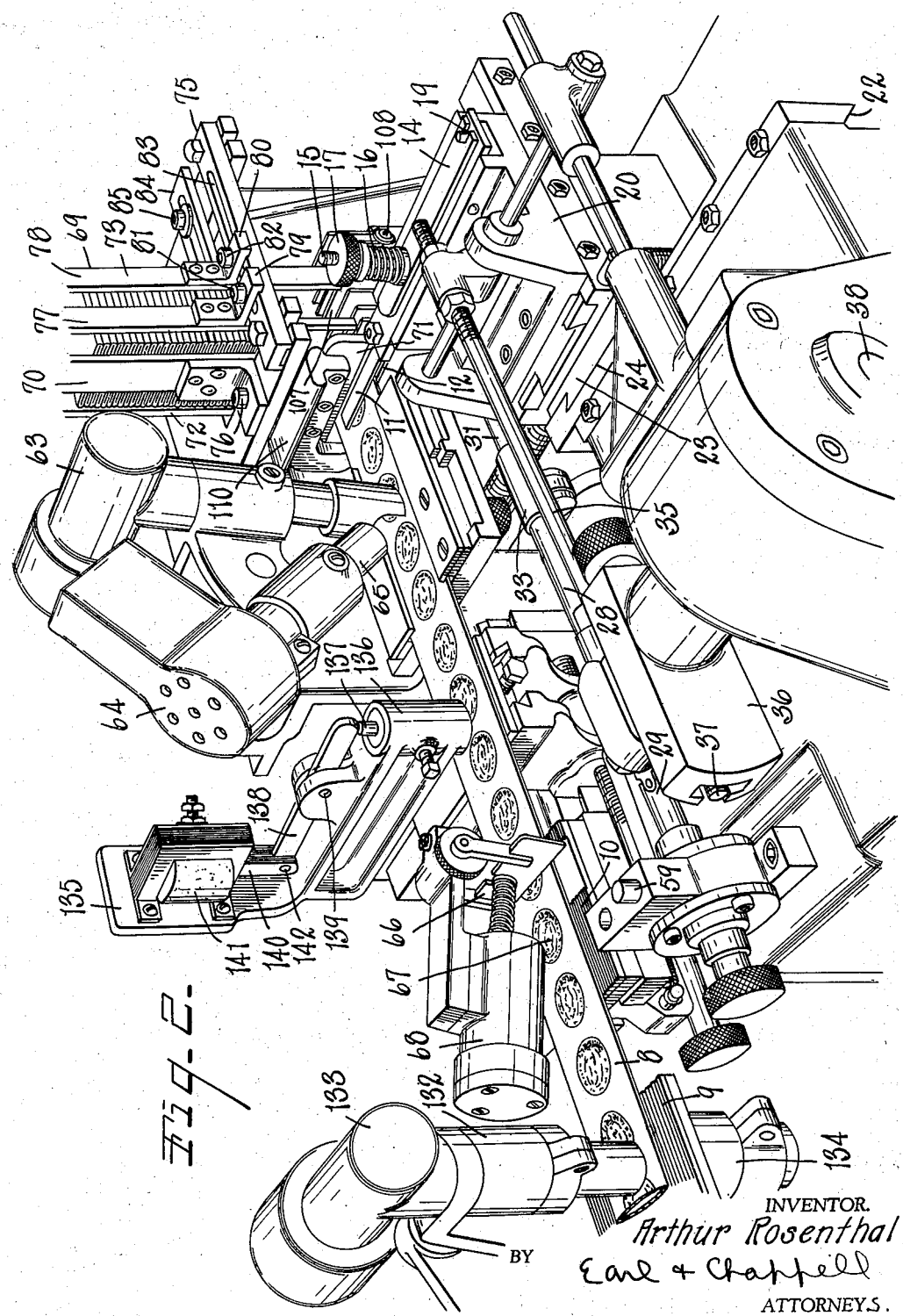
Fig. 2 is a detail perspective view from a slightly different angle showing the relationship of the operative parts.
Figure 3:
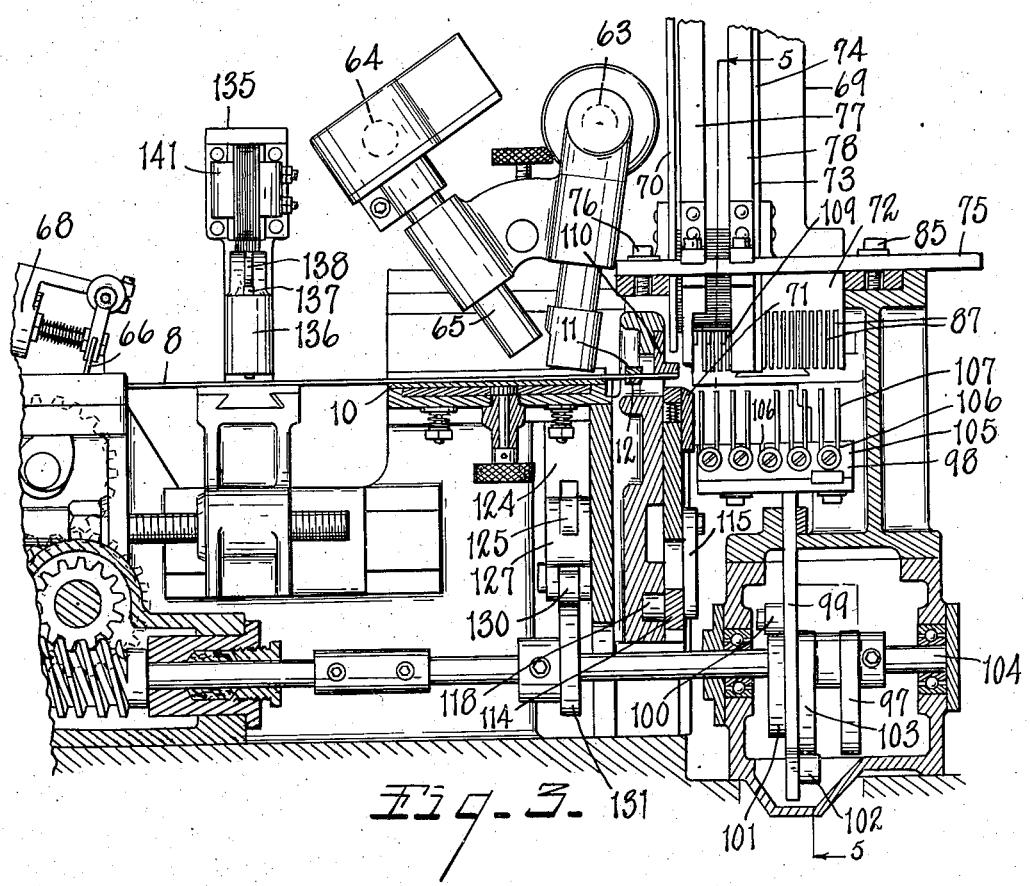
Fig. 3 is a detail sectional view taken through the cutting and packing mechanism on the line 3—3 of Fig. 5.

If it is desired, I may install an apparatus indicated generally at 135 for punching a hole through the label strip to provide a suitable opening for assisting in removal of the label from the bottle neck after it has been dried. This mechanism consists of a bearing 136 having a punch 137 therein adapted to punch a hole in the label strip. A lever 138 pivoted at 139 engages the punch. An armature 140 of an electromagnet 141 is pivoted at 142 to the other end of the lever. The operation of this punching mechanism is so timed that while the label strip is at rest after it has been released through the photo-electric cell mechanism from the jaws 66 and the movable bed plate 10 which serves as a jaw, the electromagnet 141 is energized causing the armature to move upwardly as viewed in Fig. 2, causing the punching mechanism to punch a hole in the label strip.

Having thus described my invention, what I claim as new and desire to secure by Letters Patent is:

1. In an apparatus of the class described, the combination of means for supplying a strip of labels or the like, a knife for severing individual labels from the end of the strip, means for balancing the labels with reference to the knife, means for advancing the strip the length of a single label comprising a pair of feed jaws, means for opening and closing said jaws, means for moving said jaws comprising an advancing slide for advancing the jaws to grasp the end of the strip and for retracting them from the severed label, a feeding slide for moving said jaws to feed the strip past the knife, an elevating slide for elevating the jaws, means for actuating said slides and for actuating the knife to sever an individual label from the end of the strip so timed with said means for opening and closing the jaws that the open jaws are advanced by advancing the advancing slide and the jaws are closed to grasp the end of the strip whereupon the feeding slide is actuated to feed the strip past the knife and the knife is actuated and the elevating slide is elevated and the jaws are opened and the advancing slide is retracted and thereafter the feeding slide is retracted and the elevating slide is lowered to return the jaws to position for again grasping the end of the strip and feeding the same, a packer comprising an open bottom tube disposed above and to one side of the knife and having one wall directly in line with the knife and having a plurality of adjustable walls and having one wall with a vertical slot into which the jaws move when they are elevated and to engage the label when the jaws are opened and retracted, a plunger disposed below the tube to receive the individual labels severed by the knife comprising a plurality of vertically extending fins each individually removable to prevent interference with the walls of the tube in their adjusted position, a plurality of supporting fingers extending across the bottom of the tube parallel with the fins of said plunger and out of register therewith, means for raising and lowering the plunger, and means for moving said fingers across the bottom of said packer tube and retracting them, said means being timed with said slide actuating means and said knife actuating means so that as the jaws are retracted from the severed label the label is raised by the plunger and the fingers are retracted from the opening of the tube as the plunger approaches the fingers and are then moved below the label supported on the fins of the plunger as the plunger finishes its upward movement which advances the labels into the tube and the plunger is then retracted after the supporting fingers have moved to their label supporting position to receive the next label fed by said feeding jaws and severed by said knife.

2. In an apparatus of the class described, the combination of means for supplying a strip of labels or the like, a knife for severing individual labels from the end of the strip, means for balancing the labels with reference to the knife, means for advancing the strip the length of a single label comprising a pair of feed jaws, means for opening and closing said jaws, means for moving said jaws and for actuating the knife to sever an individual label from the end of the strip so timed with said means for opening and closing the jaws that the open jaws are advanced and the jaws are closed to grasp the end of the strip whereupon the jaws are moved to feed the strip past the knife and the knife is actuated and the jaws are elevated, opened and retracted and returned to position for again grasping the end of the strip and feeding the same, a packer comprising an open bottom tube disposed above and to one side of the knife and having one wall directly in line with the knife and having a plurality of adjustable walls and having one wall with a vertical slot into which the jaws move when they are elevated and to engage the label when the jaws are opened and retracted, a plunger disposed below the tube to receive the individual labels severed by the knife comprising a plurality of vertically extending fins each individually removable to prevent interference with the walls of the tube in their adjusted position, a plurality of supporting fingers extending across the bottom of the tube parallel with the fins of said plunger and out of register therewith, means for raising and lowering the plunger, and means for moving said fingers across the bottom of said packer tube and retracting them, said means being timed with said jaw moving means and said knife actuating means so that as the jaws are retracted from the severed label the label is raised by the plunger and the fingers are retracted from the opening of the tube as the plunger approaches the fingers and are then moved below the label supported on the fins of the plunger as the plunger finishes its upward movement which advances the labels into the tube and the plunger is then retracted after the supporting fingers have moved to their label supporting position to receive the next label fed by said feeding jaws and severed by said knife.

3. In an apparatus of the class described, the combination of means for supplying a strip of labels or the like, a knife for severing individual labels from the end of the strip, means for balancing the labels with reference to the knife, means for advancing the strip the length of a single label comprising a pair of feed jaws, means for opening and closing said jaws, means for moving said jaws comprising an advancing slide for advancing the jaws to grasp the end of the strip and for retracting them from the severed label, a feeding slide for moving said jaws to feed the strip past the knife, an elevating slide for elevating the jaws, means for actuating said slides and for actuating the knife to sever an individual label from the end of the strip so timed with said means for opening and closing the jaws that the open jaws are advanced by advancing the advancing slide and the jaws are closed to grasp the end of the strip whereupon the feeding slide is actuated to feed the strip past the knife and the knife is actuated and the elevating slide is elevated and the jaws are opened and the advancing slide is retracted and thereafter the feeding slide is retracted and the elevating slide is lowered to return the jaws to position for again grasping the end of the strip and feeding the same, a packer comprising an open bottom tube disposed above and to one side of the knife and having one wall directly in line with the knife and having one wall with a vertical slot into which the jaws move when they are elevated and to engage the label when the jaws are opened and retracted, a plunger disposed below the tube to receive the individual labels severed by the knife comprising a plurality of vertically extending fins, a plurality of supporting fingers extending across the bottom of the tube parallel with the fins of said plunger and out of register therewith, means for raising and lowering the plunger, and means for moving said fingers across the bottom of said packer tube and retracting them, said means being timed with said slide actuating means and said knife actuating means so that as the jaws are retracted from the severed label the label is raised by the plunger and the fingers are retracted from the opening of the tube as the plunger approaches the fingers and are then moved below the label supported on the fins of the plunger as the plunger finishes its upward movement which advances the labels into the tube and the plunger is then retracted after the supporting fingers have moved to their label supporting position to receive the next label fed by said feeding jaws and severed by said knife.

4. In an apparatus of the class described, the combination of means for supplying a strip of labels or the like, a knife for severing individual labels from the end of the strip, means for balancing the labels with reference to the knife, means for advancing the strip the length of a single label comprising a pair of feed jaws, means for opening and closing said jaws, means for moving said jaws and for actuating the knife to sever an individual label from the end of the strip so timed with said means for opening and closing the jaws that the open jaws are advanced and the jaws are closed to grasp the end of the strip whereupon the jaws are moved to feed the strip past the knife and the knife is actuated and the jaws are elevated, opened, retracted and returned to position for again grasping the end of the strip and feeding the same, a packer comprising an open bottom tube disposed above and to one side of the knife and having one wall directly in line with the knife and having one wall with a vertical slot into which the jaws move when they are elevated and to engage the label when the jaws are opened and retracted, a plunger disposed below the tube to receive the individual labels severed by the knife comprising a plurality of vertically extending fins, a plurality of supporting fingers extending across the bottom of the tube parallel with the fins of said plunger and out of register therewith, means for raising and lowering the plunger, and means for moving said fingers across the bottom of said packer tube and retracting them, said means being timed with said jaw moving means and said knife actuating means so that as the jaws are retracted from the severed label the label is raised by the plunger and the fingers are retracted from the opening of the tube as the plunger approaches the fingers and are then moved below the label supported on the fins of the plunger as the plunger finishes its upward movement which advances the labels into the tube and the plunger is then retracted after the supporting fingers have moved to their label supporting position to receive the next label fed by said feeding jaws and severed by said knife.

5. In an apparatus of the class described, the combination of means for supplying a strip of labels or the like, a knife for severing individual labels from the end of the strip, means for balancing the labels with reference to the knife, means for advancing the strip the length of a single label comprising a pair of feed jaws, means for opening and closing said jaws, means for moving said jaws and for actuating the knife to sever an individual label from the end of the strip so timed with said means for opening and closing the jaws that the open jaws are advanced and the jaws are closed to grasp the end of the strip whereupon the jaws are moved to feed the strip past the knife and the knife is actuated and the jaws are opened, retracted and returned to position for again grasping the end of the strip and feeding the same, a packer comprising an open bottom tube disposed above and to one side of the knife, a plunger disposed below the tube to receive the individual labels severed by the knife comprising a plurality of vertically extending fins, a plurality of supporting fingers extending across the bottom of the tube parallel with the fins of said plunger and out of register therewith, means for raising and lowering the plunger, and means for moving said fingers across the bottom of said packer tube and retracting them, said means being timed with said jaw moving means and said knife actuating means so that as the jaws are retracted from the severed label the label is raised by the plunger and the fingers are retracted from the opening of the tube as the plunger approaches the fingers and are then moved below the label supported on the fins of the plunger as the plunger finishes its upward movement which advances the labels into the tube and the plunger is then retracted after the supporting fingers have moved to their label supporting position to receive the next label fed by said feeding jaws and severed by said knife.

ARTHUR ROSENTHAL.